(12) United States Patent
Durick et al.

(10) Patent No.: US 6,447,077 B1
(45) Date of Patent: Sep. 10, 2002

(54) LIFT LINK FLEXIBLE TRACK

(75) Inventors: David A. Durick, Fargo; Bill R. Borkowski, Horace, both of ND (US); Peter D. Stanek, Moorhead, MN (US)

(73) Assignee: Loegering Mfg. Inc., Casselton, ND (US)

(*) Notice: Subject to any disclaimer, the term of this patent is extended or adjusted under 35 U.S.C. 154(b) by 0 days.

(21) Appl. No.: 09/925,226

(22) Filed: Aug. 8, 2001

Related U.S. Application Data

(60) Provisional application No. 60/223,784, filed on Aug. 8, 2000.

(51) Int. Cl.$^7$ .................................................. B62D 55/12
(52) U.S. Cl. ...................................... 305/201; 305/114
(58) Field of Search .................. 305/111, 112, 305/113, 114, 198, 201, 193, 194, 195, 196, 197

(56) References Cited

U.S. PATENT DOCUMENTS

| | | | |
|---|---|---|---|
| 3,497,271 A | | 2/1970 | Keller |
| 4,089,565 A | | 5/1978 | Loegering et al. |
| 4,099,794 A | * | 7/1978 | Hoffart .................. 305/196 |
| 4,813,750 A | * | 3/1989 | Erlenmaier et al. .......... 305/201 |
| 5,284,387 A | | 2/1994 | Loegering |
| 5,429,429 A | | 7/1995 | Loegering et al. |
| 5,749,635 A | * | 5/1998 | Umbarger ................. 305/201 |
| 5,951,124 A | | 9/1999 | Hoffart |
| 5,988,776 A | | 11/1999 | Zurn |
| 6,010,199 A | | 1/2000 | Hoffart |
| 6,203,127 B1 | * | 3/2001 | Chapman ................. 305/201 |
| 6,394,562 B1 | * | 5/2002 | Sjostrom ................. 305/196 |

* cited by examiner

Primary Examiner—S. Joseph Morano
Assistant Examiner—Long Bao Nguyen
(74) Attorney, Agent, or Firm—Moore & Hansen

(57) ABSTRACT

A flexible track used for wraparound mounting on construction vehicle tires including a main pad assembly and a lift link assembly. The lift link assembly has a link component and a link pad pivotally connected to the main pad assembly for increasing track flotation and durability. The link component has a link base pivotally connected to the main component of the main pad assembly. The link component also has a link top that has a bonding aperture and is perpendicular relative to the link base forming an overhang. The link pad has a side wrap and under wrap. The link pad is rigidly connected to the link component for reducing track damage to the ground.

19 Claims, 4 Drawing Sheets

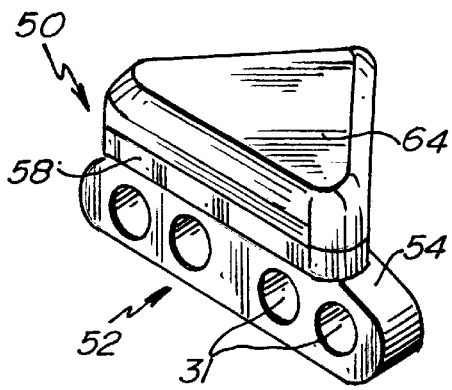
_Fig. 6._
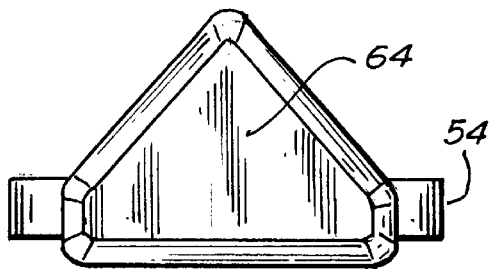
_Fig. 9._
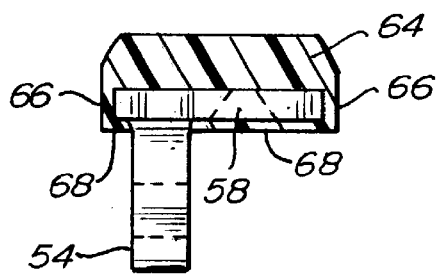
_Fig. 7._
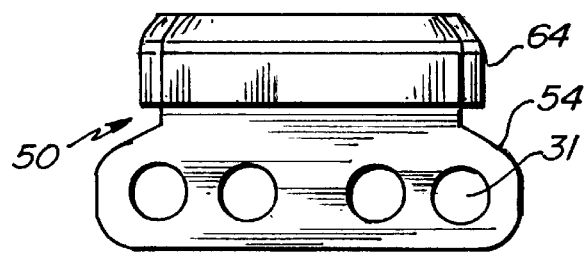
_Fig. 8._
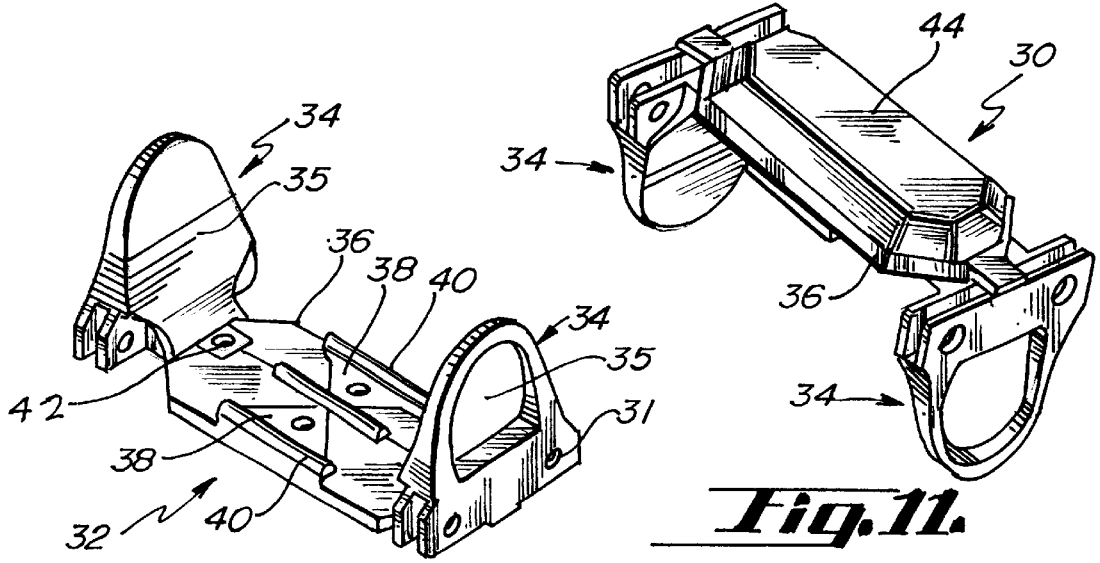
_Fig. 10._
_Fig. 11._

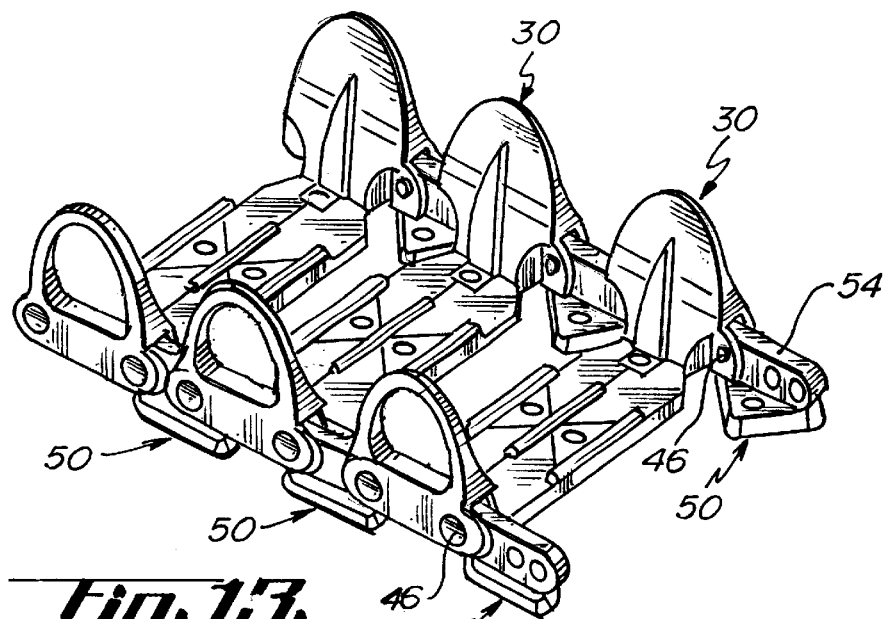
_fig.13._
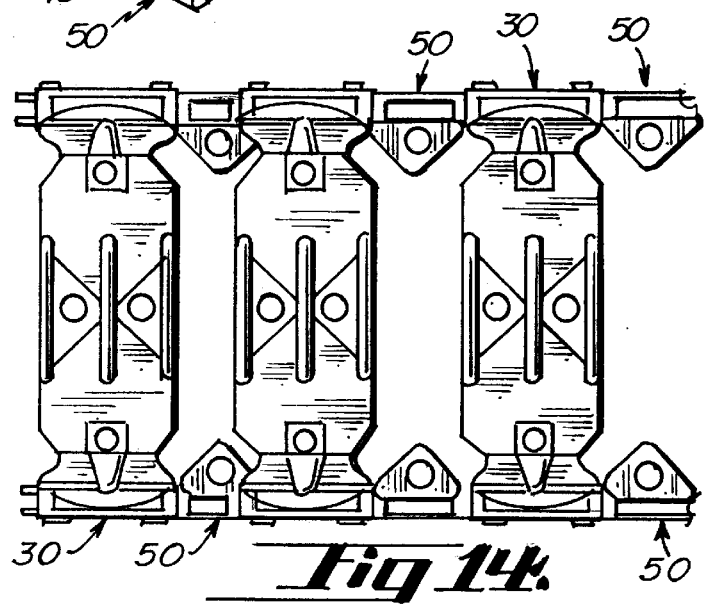
_fig.14._
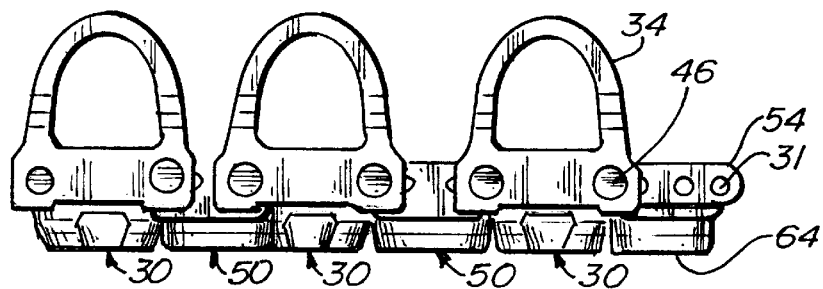
_fig.15._

LIFT LINK FLEXIBLE TRACK

This application claims the benefit of prior filed, now abandoned provisional application Serial No. 60/223,784 filed Aug. 8, 2000 by inventors David A. Durick, Bill R. Borkowski and Peter D. Stanek.

The present invention relates generally to a removable, flexible track belts used to wrap around vehicle tires to provide additional traction and particularly to lift links for such track belts to provide additional flotation, a smoother ride and reduced finished surface media damage.

BACKGROUND OF THE INVENTION

The use of an endless track as a traction enhancer for wheeled vehicles is well known. Typically, such endless track belts comprise a plurality of individual track sections that are linked together for pivotal movement with respect to adjacent track sections. These track belts have traditionally been used to obtain better overall vehicle traction especially in wet and slippery conditions.

Some currently known flexible tracks suffer from the disadvantage when used in the field of having the track pad unevenly wearing away which prematurely marks or damages the ground media that the tracks traverse such as by gouging streets or scarring pavement. Another disadvantage to current tracks is that they can create a rough ride.

The flexible track of the present invention improves or overcomes those difficulties described above and provides other features and advantages previously not available.

SUMMARY OF THE INVENTION

A benefit of the lift link being integral with the track system is that the lift link increases the surface area of the flexible track and thereby increases wear and durability of the track, improves traction, and increases flotation.

The lift link flexible track of the present invention provides a smoother ride by decreasing the gap between the pad assemblies so the track performs more like a continuous belt. The lift link helps to decrease the amount of ground pressure on each main pad by increasing the contact area of the track with the ground.

Accordingly, a flexible track used upon a ground media for wraparound mounting on a vehicle tire comprises a ground-engaging member pivotally connected to a lifting member.

A ground-engaging member in the form of a main pad assembly comprises a main component and a main pad for the vehicle tire traction and flotation. The main component comprises a main pad bottom and a pair of side plates for securing the vehicle tire to the flexible track. The main pad bottom comprises a triangularly elevated portion rigidly connected to the main pad bottom for allowing mud from the tire to exit the main pad assembly and a traction bar rigidly connected to the main pad bottom for increasing traction between the tire and the main pad assembly. The pair of side plates are each rigidly connected to the main pad bottom for retaining the track over the tire. The main pad is rigidly connected to the main pad bottom for reducing track damage to the ground media.

A lifting member such as a lift link assembly comprises a link component and a link pad pivotally connected to the main pad assembly for increasing track flotation and durability. The link component comprises a link base and a link top, and the link base is pivotally connected to the main component of the main pad assembly. The link top defines a bonding aperture. The link top is perpendicular relative to the link base. The link top has an overhang between the link top and the link base. The link pad also has a side wrap, an under wrap and a portion of the link pad disposed through the bonding aperture of the link top for a stronger connection between the link top and the link pad. The link pad is rigidly connected to the link component for reducing track damage to the ground media. The lift link assembly is pivotally connected to the main pad assembly for increasing track flotation and durability.

In addition to the substantially flat shape of the link top, the link top can have a mid portion and a distal portion where the mid portion is perpendicular relative to the link base and the distal portion is non-perpendicular relative to the link base.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 6 is a perspective bottom plan view of the lift link assembly;

FIG. 7 is a rear side elevational view of the lift link assembly;

FIG. 8 is an enlarged right side elevational view of the lift link assembly;

FIG. 9 is an enlarged bottom plan view of the lift link assembly;

FIG. 10 is a perspective top plan view of a main component;

FIG. 11 is a perspective bottom plan of the main pad assembly;

FIG. 13 is a perspective top plan view of a section of flexible track;

FIG. 14 is a top plan view as viewed from the tire to the ground of a section of flexible track;

FIG. 15 is a right side elevational view of a section of flexible track;

DETAILED DESCRIPTION

Figure 1:
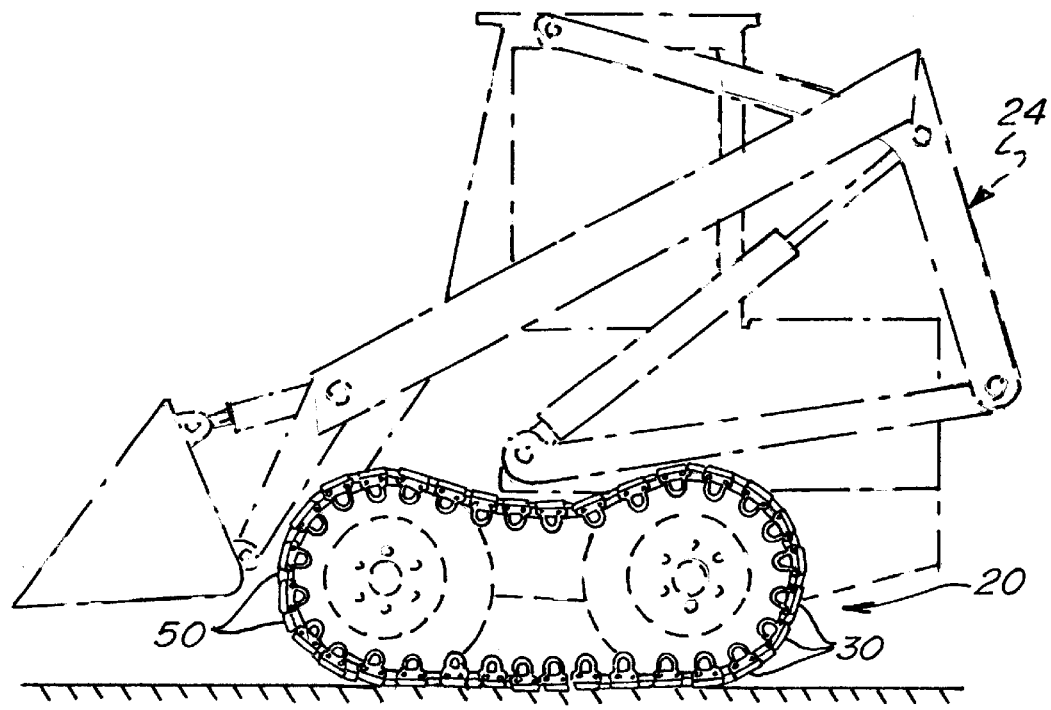
FIG. 1 is a right side elevational view of a preferred embodiment of the lift link flexible track of the present invention shown over the tires of a construction vehicle.
Figure 2:
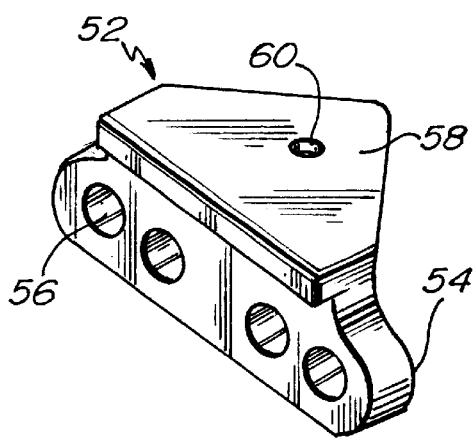
FIG. 2 is a perspective bottom plan view of a link component.
Figure 3:
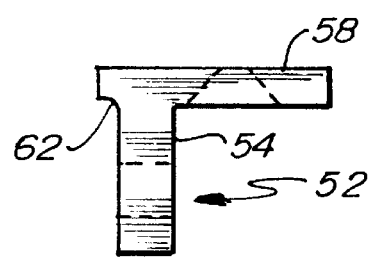
FIG. 3 is a rear side elevational view of the link component.
Figure 4:
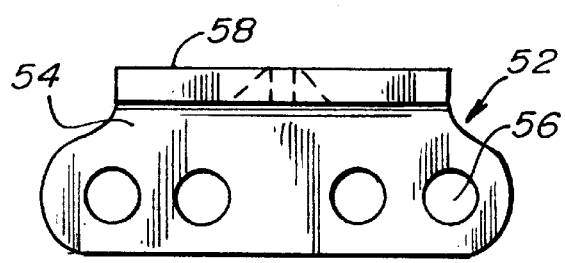
FIG. 4 is an enlarged right side elevational view of the link component.
Figure 5:
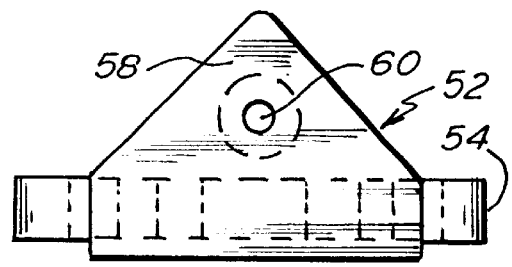
FIG. 5 is a bottom plan view of the link component.

These and other objectives and advantages of the invention will appear more fully from the following description, made in conjunction with the accompanying drawings wherein like reference characters refer to the same or similar parts throughout the several views. With reference to the four sheets of drawings, FIGS. 1–17, a flexible track 20 for wraparound mounting on tires 22 of a construction vehicle 24 comprises a ground-engaging member pivotally connected to a lifting member.

General examples of tract belts and their operation are disclosed in the U.S. Pat. No. 5,284,387 issued to Loegering on Feb. 8, 1994, the U.S. Pat. No. 5,429,429 issued to Loegering on Jul. 4, 1994, and the U.S. Pat. No. 5,988,776 issued to Zurn on Nov. 23, 1999 and assigned to Loegering Mfg. Inc., the disclosure of which is hereby incorporated by reference.

A ground-engaging member in the form of the main pad assembly 30 comprises a main component 32 and a main pad 44 for the vehicle tire 22 traction and flotation. The main component 32 comprises a main pad bottom 36 and a pair of side plates 34 for securing the vehicle tire 22 to the flexible track 20. The main paid bottom 36 comprises a triangularly elevated portion rigidly connected to the main pad bottom 36 for allowing mud from the tire 22 to exit the main pad assembly 30 and a traction bar 40 rigidly connected to the main pad bottom 36 for increasing traction between the tire 22 and the main pad assembly 30. The pair of side plates 34 are each rigidly connected to the main pad bottom 36 for retaining the track 20 over the tire 22. The main pad 44 is rigidly connected to the main pad bottom 36 for reducing flexible track 20 damage to the ground media.

The main pad assembly 30 comprises a main component 32 and a main pad 44. The main component 32 comprises a pair of side plates 34 and a main pad bottom 36. The main component 32 may be made of a casting, weldment or mechanically attached parts. Disposed on the main pad bottom 36 is a pair of triangularly raised portions for cleaning out dirt. The main pad bottom 36 also has at least one, preferably three, traction bars 40. Another traction bar configuration on the main pad bottom 36 utilizes one traction bar (not shown) having a mostly rectangular shape with triangular ends in the center of and extending longitudinally along a majority of the main pad bottom 36. The main pad bottom 36 also defines a plurality of apertures 42 for fasteners such as flat-head socket cap screws (not shown).

A lifting member such as a lift link assembly 50 comprises a link component 52 and a link pad 64 pivotally connected to the main pad assembly 30 for increasing flexible track 20 flotation and durability. The link component 52 comprises a link base 54 and a link top 58. The link base 54 is pivotally connected to the main component 32 of the main pad assembly 30. The link top 58 defines a bonding aperture 60. The link top 58 is perpendicular relative to the link base 54. The link top 58 has an overhang 62 between the link top 58 and the link base 54. The link pad 64 also has a side wrap 66, an under wrap 68 and a portion of the link pad 64 disposed through the bonding aperture 60 of the link top 58 for a stronger connection between the link top 58 and the link pad 64. The link pad 64 is rigidly connected to the link component 52 for reducing flexible track 20 damage to the ground media. The lift link assembly 50 is pivotally connected to the main pad assembly 30 for increasing track 20 flotation and durability.

In addition to the substantially flat shape of the link top 58, the link top 58 can have a mid portion 82 and a distal portion where the mid portion 82 is perpendicular relative to the link base 54 and the distal portion is non-perpendicular relative to the link base 54.

The lift link assembly 50 comprises a link component 52 and a link pad 64. The link component 52 is an integral piece comprising a link base 54 and a link top 58. The link base 54 defines at least three, preferably four, pin apertures 56 for receiving main pins 46 that connect the lift link 50 to the adjacent main pads 44 located on either side of the lift link 50. The link top 58 defines a bonding aperture 60 that provides a mechanical bond with the urethane link pad 64 that extends into the bonding aperture 60 of the link top 58. The link component 52 may be made of a casting, weldment, mechanically attached parts or preferably a forged weldment.

The link pad 64 is treated to be affixed securely to the link base 54 with both a chemical bonding and a mechanical bonding through the bonding aperture 60. A preferred link pad 64 is made of 95 durometer urethane. Other suitable link pad 64 materials include other types of urethane of different durometers, plastics and rubber. The link pad 64 also covers the outer sides of the link top 58 to create a side wrap 66. The link pad 64 further surrounds the bottom portion of the link top 58 to create an under wrap 68 for purposes of increasing a secure connection between the link pad 64 and the link top 58.

An overhang 62 is formed by connecting the link base 54 to the link top 58 at a point slightly away from the edge of the link top 58. Instead of connecting the link base 54 to the link top 58 at a flush 90° angle between each other, they are connected to form an overhang 62 for the purpose of opposing the tensional force of the twisting link pad 64 between the tire 22 and the ground media. Ideally, the link base 54 would be placed at the centroid or center of gravity of the link top 58 and link pad 64 for maximum opposition to lift link 50 twisting but clearance problems with the machine prevents such centroid placement. Therefore, the overhang 62 relationship between the link base 54 onto the link top 58 is employed.

In operation, the flexible track 20 comprises a series of repeating lift link assemblies 50 pivotally connected to main pad assemblies 30 by a retention assembly such as pins. The flexible track 20 is placed over tires 22 of a heavy equipment vehicle 24 such as a skid steer loader with the main pads 44 and link pads 64 of the flexible track 20 distal from the tires 22 for contacting the ground.

Figure 16:
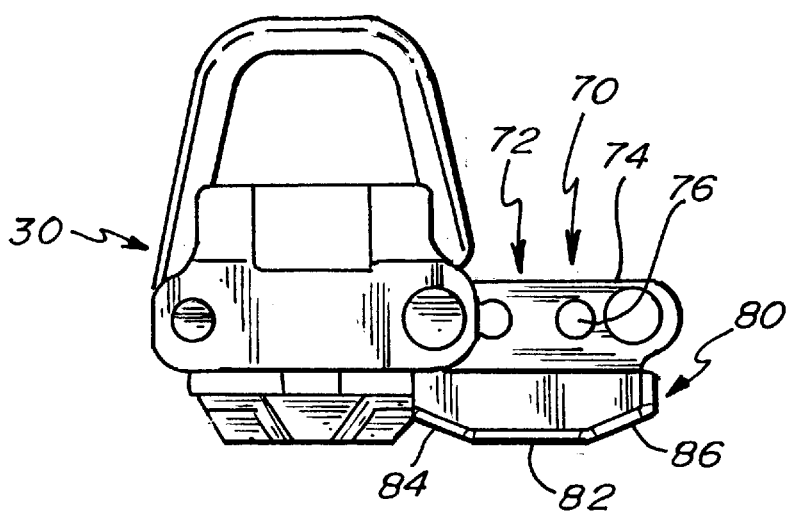
FIG. 16 is a right side elevational view of an alternative preferred embodiment of the lift link assembly connected to the main pad assembly.
Figure 17:
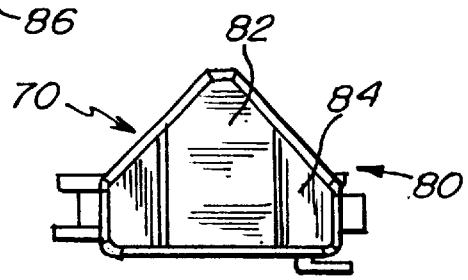
FIG. 17 is a bottom plan view of the alternative preferred embodiment of the lift link assembly.
Figure 12:
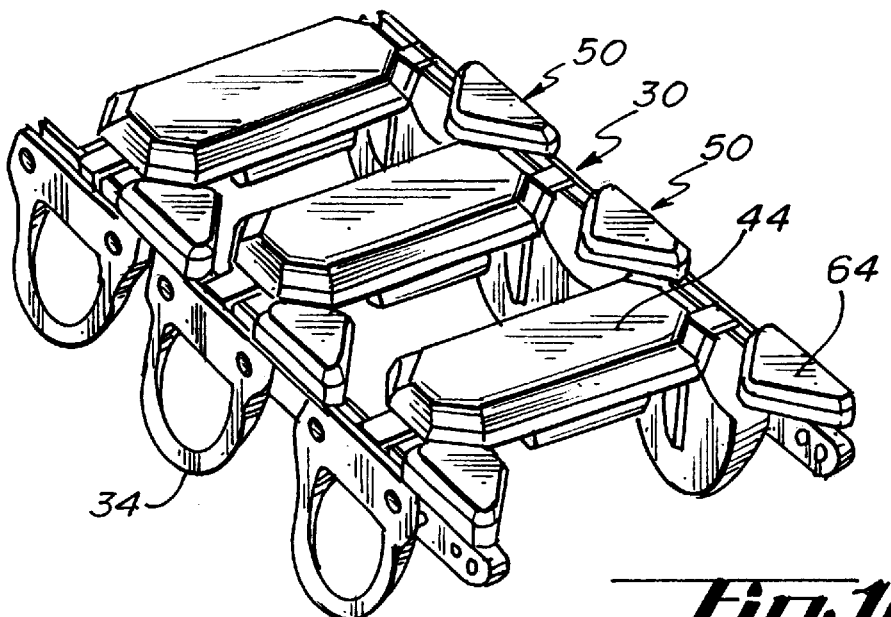
FIG. 12 is a perspective bottom plan view of a section of flexible track.

While a preferred embodiment has been described, the details may be changed without departing from the invention as defined by the claims. For example, another preferred embodiment of the invention is shown in FIGS. 16 and 17. FIG. 16 is a right side elevational view of an alternative preferred embodiment of the lift link assembly 70 connected to the main pad assembly 30. FIG. 17 is a bottom plan view of the lift link assembly 70. The lift link assembly 70 of this preferred embodiment is similar to the previously described lift link assembly 50 except for the link pad 80. The formerly described link pad 64 has a flat bottom while this link pad 80 has slopes. The link pad 80 has a mid portion 82 that is flat, a first distal portion 84 that is sloped, and a second distal portion 86 that is also sloped. The sloped shape of the link pad 80 is formed by molding the link pad 80. An advantage to providing slopes to the link pad 80 is for reducing pressure on the link pad 80 when the vehicle 24 turns and the flexible track 20 is cornering. A preferred link pad 80 is made of 95 durometer urethane, but other suitable link pad 80 include urethane of different durometers, plastics and rubber materials.

The foregoing is illustrative of the principles of the invention. Since numerous modifications and changes will readily occur to those skilled in the art, it is not desired to limit the invention to the exact construction and operation shown and described.

What is claimed is:

1. A flexible track used upon a ground media for wrap-around mounting on a vehicle tire comprising:
   a plurality of ground-engaging members for improving the vehicle tire traction; and
   a plurality of lifting members, each of said lifting members comprising a link component, said link component comprising a link base and a link top, said link base being secured to said link top, said link base and said link top forming a L-shaped structure for increasing the surface area of the flexible track to increase track flotation and durability, said lifting member being pivotally connected to said ground-engaging member, said plurality of ground-engaging members and said plurality of lifting members forming a continuous flexible track to provide a smoother vehicle ride.

2. A flexible track as in claim 1 wherein the link top and the link base form an overhang for opposing the tensional force of a lifting member twisting between the tires of the vehicle and the ground media.

3. A flexible track as in claim 1 wherein the link top is substantially perpendicular relative to the link base.

4. A flexible track as in claim 1 wherein the link top has first and second distal portions and a mid portion, the mid portion being disposed between the first and second distal portions, said mid portion being substantially perpendicular relative to the link base, and the first and second distal portions being substantially non-perpendicular relative to the link base.

5. A flexible track as in claim 1 wherein said ground-engaging member further comprises a main pad, the main pad being rigidly connected to the link top of the link component for reducing track damage to the ground media.

6. A flexible track as in claim 1 wherein said lifting member further comprises a link pad rigidly connected to the link top for reducing track damage to the ground media.

7. A flexible track as in claim 6 wherein said link pad has a side wrap disposed upon the link top.

8. A flexible track as in claim 7 wherein the link pad has an under wrap disposed upon the link top.

9. A flexible track as in claim 7 wherein the link top defines a bonding aperture for providing a mechanical connection between the link pad and the link top.

10. A flexible track used upon a ground media for wrap-around mounting on a vehicle tire comprising:
    a plurality of ground-engaging members for improving the vehicle tire traction; and
    a plurality of lifting members, each of said lifting members comprising a link component, said link component comprising a link base and a link top, said link base being secured to said link top, said link base and said link top forming a L-shaped structure for increasing the surface area of the flexible track to increase track flotation and durability, said link top having a first and second distal portion and a mid portion, the mid portion disposed between the first and second distal portions, said mid portion being substantially perpendicular relative to the link base, and the first and second distal portions being substantially non-perpendicular relative to the link base, said lifting member being pivotally connected to said ground-engaging member, said plurality of ground-engaging members and said plurality of lifting members forming a continuous flexible track to provide a smoother vehicle ride.

11. A flexible track as in claim 10 wherein the link top and the link base form an overhang for opposing the tensional force of a lifting member twisting between the tires of the vehicle and the ground media.

12. A flexible track as in claim 10 wherein the link top is substantially perpendicular relative to the link base.

13. A flexible track as in claim 10 wherein the link top has first and second distal portions and a mid portion, the mid portion being disposed between the first and second distal portions, said mid portion being substantially perpendicular relative to the link base, and the first and second distal portions being substantially non-perpendicular relative to the link base.

14. A flexible track as in claim 10 wherein said ground-engaging member further comprises a main pad, the main pad being rigidly connected to the link top of the link component for reducing track damage to the ground media.

15. A flexible track as in claim 10 wherein said link pad has a side wrap disposed upon the link top.

16. A flexible track as in claim 10 wherein the link pad has an under wrap disposed upon the link top.

17. A flexible track as in claim 10 wherein the link pad has an under wrap covering a substantial portion of the lower surface of the link top.

18. A flexible track used upon a ground media for wrap-around mounting on a vehicle tire comprising: a main pad assembly comprising a main component and a main pad for the vehicle tire traction and flotation, said main component comprising a main pad bottom and a pair of side plates for securing the vehicle tire to the flexible track, the main paid bottom comprising a triangularly elevated portion rigidly connected to the main pad bottom for allowing mud from the tire to exit the main pad assembly and a traction bar rigidly connected to the main pad bottom for increasing traction between the tire and the main pad assembly, the pair of side plates are each rigidly connected to the main pad bottom for retaining the track over the tire, the main pad rigidly connected to the main pad bottom for reducing track damage to the ground media; and
    a lift link assembly comprising a link component and a link pad pivotally connected to the main pad assembly for increasing track flotation and durability, said link component comprising a link base and a link top, the link base being pivotally connected to the main component of the main pad assembly, the link top defining a bonding aperture, the link top being perpendicular relative to the link base, the link top having an overhang between the link top and the link base, the link pad having a side wrap, an under wrap and a portion of the link pad disposed through the bonding aperture of the link top for a stronger connection between the link top and the link pad, the link pad being rigidly connected to the link component for reducing track damage to the ground media, the lift link assembly being pivotally connected to the main pad assembly for increasing track flotation and durability.

19. A flexible track as in claim 18 wherein the link top has a mid portion and a distal portion, the mid portion is perpendicular relative to the link base and the distal portion is non-perpendicular relative to the link base.

* * * * *